United States Patent [19]
Cheng et al.

[11] 4,378,984
[45] Apr. 5, 1983

[54] DISTILLATIVE FREEZING PROCESS FOR SEPARATING VOLATILE MIXTURES

[76] Inventors: Chen-Yen Cheng; Sing-Wang Cheng, both of 9605 La Playa St., NE., Albuquerque, N. Mex. 87111

[21] Appl. No.: 296,130

[22] Filed: Aug. 25, 1981

Related U.S. Application Data

[63] Continuation-in-part of Ser. No. 181,002, Aug. 22, 1980, abandoned, which is a continuation-in-part of Ser. No. 930,312, Aug. 2, 1978, Pat. No. 4,218,893, and Ser. No. 676,640, Apr. 13, 1976, abandoned, and Ser. No. 816,852, Jul. 18, 1977, abandoned.

[51] Int. Cl.³ ............................................... F25J 3/00
[52] U.S. Cl. ......................................... 62/12; 62/532; 23/294 S
[58] Field of Search ................ 62/12, 13, 14, 532; 23/299 R, 254 S; 152/611, 614

[56] References Cited

U.S. PATENT DOCUMENTS

| | | | |
|---|---|---|---|
| 1,534,130 | 4/1925 | McAfee et al. | 23/294 |
| 1,901,486 | 3/1933 | Wurster et al. | 23/294 |
| 2,572,933 | 10/1951 | Houvener | 62/14 |
| 2,715,323 | 8/1955 | Johnson et al. | 62/14 |
| 2,737,784 | 3/1956 | Becker et al. | 62/14 |
| 2,812,645 | 11/1957 | Locklair et al. | 62/14 |
| 3,042,501 | 7/1962 | Noblitt | 23/294 S |
| 3,930,800 | 1/1976 | Schoener et al. | 23/294 R |

*Primary Examiner*—Norman Yudkoff

[57] ABSTRACT

The distillative freezing process disclosed is useful in separating a mixture containing at least two volatile components, denoted respectively as A-component and B-component, by simultaneously vaporizing the two components from the mixture under a sufficiently reduced pressure to simultaneously crystallize B-component. The vapor mixture obtained is brought to a condensed state either by a simple condensation operation or a condensation-desublimation operation without being substantially pressurized. The process may be continued to completely eliminate the liquid phase and bring the mixture into the two phase solid-vapor region. Then, the solid phase is no longer contaminated by the adhering liquid phase and gives a high purity B-component on melting. The process is particularly useful in separating mixtures containing close boiling components, such as styrene-ethyl benzene mixtures, p-xylene-m-xylene mixtures and ethylene-ethane mixtures. The process can therefore be used in producing high purity monomers for the plastic industries and high purity chemicals for other industries.

17 Claims, 23 Drawing Figures

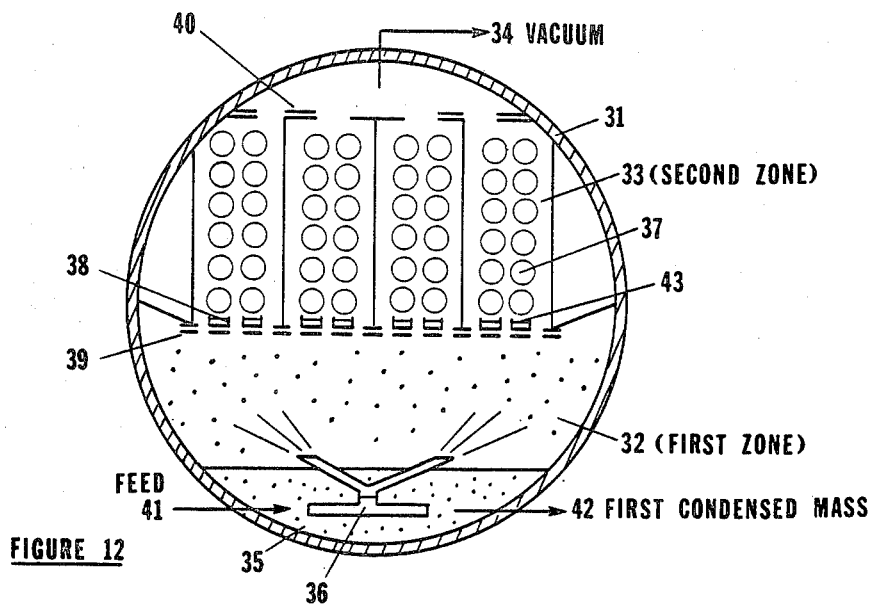
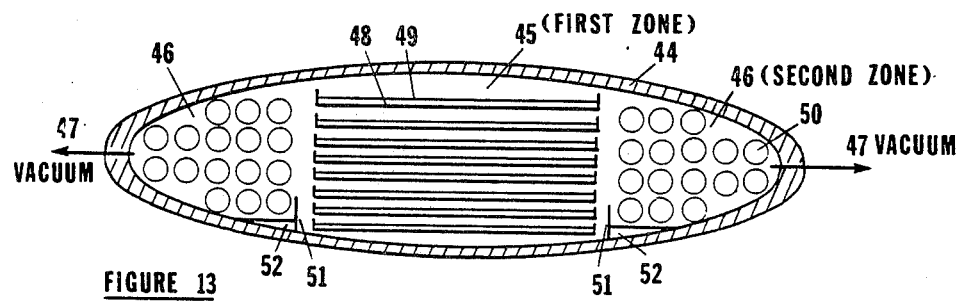
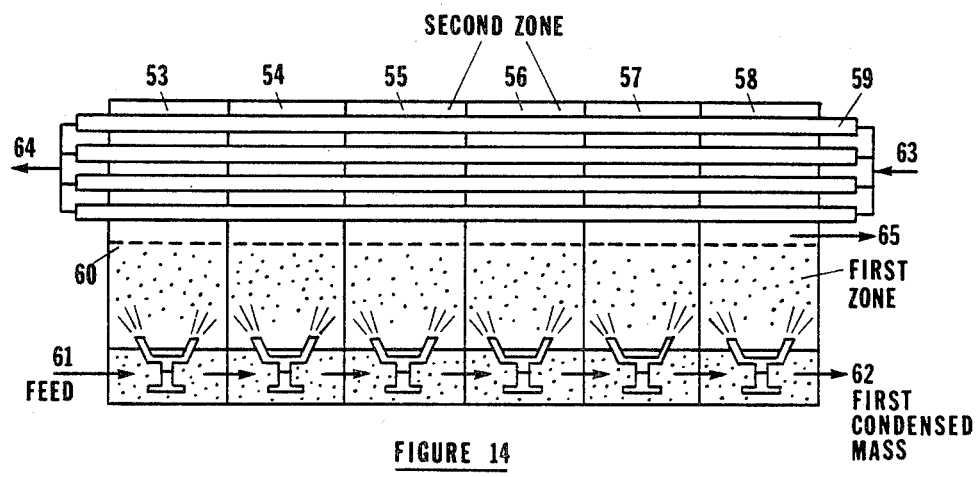

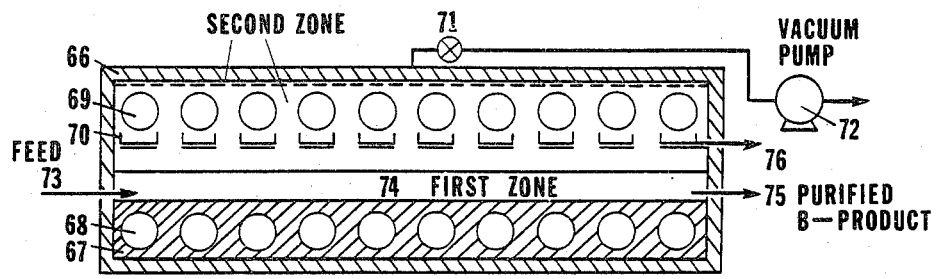
FIGURE 15
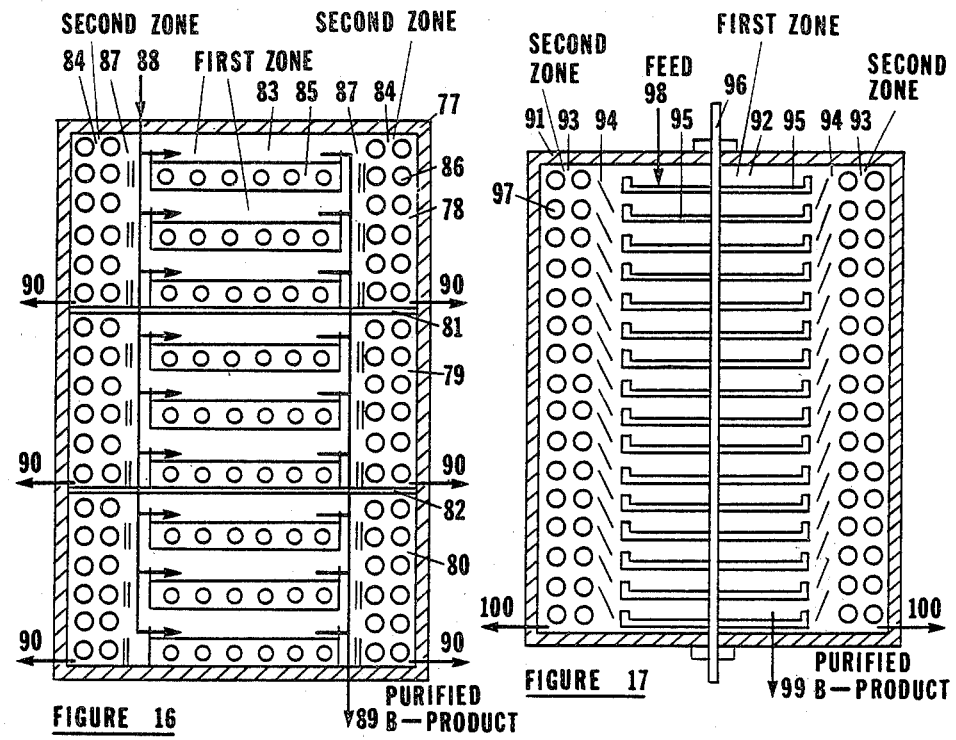
FIGURE 16
FIGURE 17
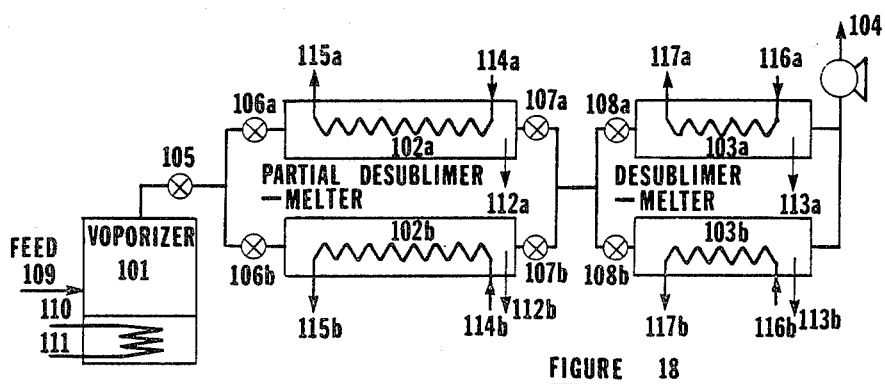
FIGURE 18

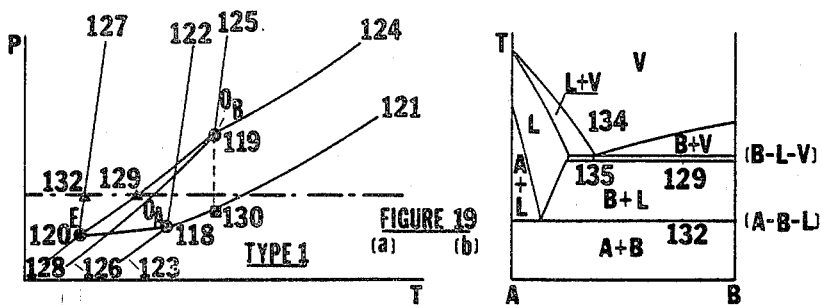
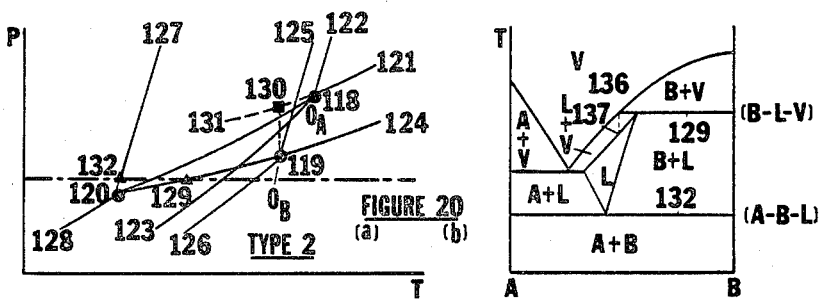
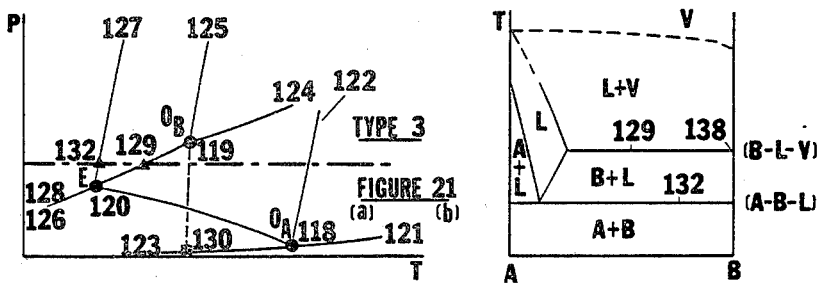
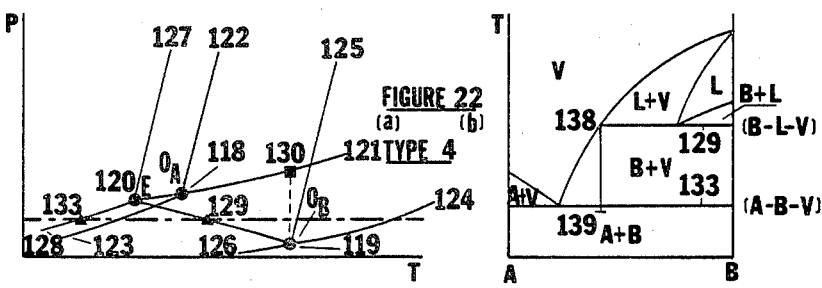
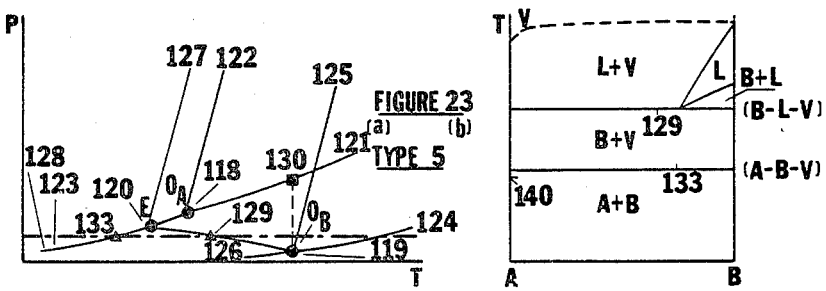

DISTILLATIVE FREEZING PROCESS FOR SEPARATING VOLATILE MIXTURES

RELATED APPLICATIONS

This application is a continuation-in-part application of Ser. No. 06/181,002 application filed on Aug. 22, 1980, now abandoned, which, in turn, is a continuation-in-part application of (1) Ser. No. 930,312 application filed on Aug. 2, 1978, now U.S. Pat. No. 4,218,893, and entitled "Distillative Freezing Process for Separating Volatile Mixtures", (2) Ser. No. 676,640 application filed on Apr. 13, 1976, now abandoned, and entitled "Simultaneous Flash-Vaporization and Fractional Solidification Process" and (3) Ser. No. 816,852 application filed on July 18, 1977, now abandoned, and entitled "Solic-Vapor Region Refining Process."

BACKGROUND OF THE INVENTION

1. Field of Invention

Separation of a mixture containing volatile components is a very important operation in chemical industries. In some cases, the required product purities are very high. Examples are production of polymerization grade monomers, such as ethylene, propylene, styrene, butadiene and p-xylene. Distillation operations have been used in most cases and freezing operations have been used in some special cases. The distillative freezing process disclosed combines the advantageous features of both the distillation and freezing operations and remove their disadvantages.

2. Brief Description of the Prior Art

When a distillation operation is used in separating a mixture containing components that are very close in boiling points and volatilities, the number of plates required is very large and a large reflux ratio has to be used. Therefore, both the equipment cost and operating cost are very high. Furthermore, these costs increase greatly as the required product purity increases. Separations of ethylene-ethane mixtures, propylene-propane mixtures, styrene-ethylbenzene mixtures and p-xylene-m-xylene mixtures in producing high grade ethylene, propylene, styrene and p-xylene respectively are good examples. There is a great need for finding a better and more economical way of accomplishing the desired separations.

In a conventional fractional solidification process, a feed containing a crystallizing component and one or more impurities is brought into a two phase solid-liquid region to form a mixture containing crystals of the crystallizing component and a liquid mixture containing the impurities. An expensive scraped surface freezer is usually used in this operation. A centrifuge or a hydraulic washing column is then used to free the crystals from the mother liquor. Even though the crystals formed are usually very pure, it has been very difficult to produce a very high purity product of the crystallizing component, because a complete separation of the crystals from the surrounding impure liquid phase is difficult. Furthermore, equipment cost of a conventional solidification process is usually very high.

It is important to distinguish the distillative freezing process of the present invention from a vacuum freezing desalination process, a vacuum crystallization process, a vacuum drying process, and a conventional desublimation process for removing a component from a gas mixture. In a vacuum freezing desalination process (also called an evaporative freezing process), only one component (water) vaporizes and the same component (water) freezes. In a vacuum crystallization process or a vacuum drying process, only one component (solvent) evaporates while the other component (solute) crystallizes. In a conventional desublimation process, a gas mixture is cooled down to a very low temperature to remove a crystallizing component (e.g. carbon dioxide or phthalic anhydride) by a desublimation operation and simply discharge the residual gas. In a distillative freezing process, two or more components are vaporized from a feed under a sufficiently reduced pressure and only one component freezes. The low pressure vapor formed in a distillative freezing process is transformed completely into a condensed mass without pressurization by slightly lowering its temperature. The phase behavior of a binary system to which a distillative freezing process applies is distinct from phase behaviors of binary systems to which these processes apply.

BRIEF DESCRIPTION OF THE INVENTION

Each of the processes to be described is useful in separating a mixture that contains at least two key components that are volatile and have close boiling temperatures and close volatilities. One of the components is a non-crystallizing component and is denoted as A-component and the other is a crystallizing component and is denoted as B-component. The two components form a binary system (a) whose characteristic vapor pressure ratio defined as the ratio of the vapor pressure of A-component to that of B-component both evaluated at the triple point temperature of B-component is in the range of 0.1 to 10, and is lower than the ratio of the latent heat of sublimation and the latent heat of melting of the B-component evaluated at the triple point of the B-component, and (b) whose constant pressure phase diagram taken at a three phase (B-enriched solid, liquid and vapor) pressure has a two phase (B-enriched solid and vapor) region covering a substantial concentration range above the three phase (B-enriched solid, liquid and vapor) temperature and a two phase (B-enriched solid and liquid) region below the three phase (B-enriched solid, liquid and vapor) temperature.

Each process has a first characteristic step of forming a low pressure vapor mixture of the components and a solid phase enriched (in many cases substantially pure) in B-component. Each process also has a second characteristic step of bringing the low pressure vapor mixture to a condensed state, as a condensate or a condensate-desublimate mix, by slightly lowering its temperature without substantially pressurizing it. This temperature is higher than the eutectic temperature of the binary system at a low pressure.

In the basic process, heat of crystallization is withdrawn at least partly by concurrently vaporizing portions of the two components from a mixture under a sufficiently reduced pressure that is lower than the triple point pressure of the B-component to form a low pressure vapor mixture and a slurry that comprises a mother liquor and a solid phase enriched with B-component. The B-enriched solid phase is separated from the mother liquor and melted to yield a B-enriched product.

In the first modified process, the concurrent vaporization step described is continued until the mother liquor is completely or substantially completely eliminated so that substantially all of the A-component is transferred to the low pressure vapor phase. In the second modified process, a gas mixture of A and B-components is first formed and the gas mixture is cooled under a sufficiently reduced pressure that is lower than the triple point pressure of B-component to form a B-solid phase while keeping substantially all of the A-component in the remaining vapor phase. In both of these modified processes, the need for separating B-solid from mother liquor has been eliminated. The B-solids obtained in these modified processes can be melted to give very pure B-products. For example, p-xylene of better than 99.98% purity has been obtained.

The low pressure vapor mixture obtained in each of these processes contains substantial amounts of both components. This vapor is transformed into a condensed mass, either a simple condensate (liquid) or a condensate-desublimate (liquid and solid) mixture, by a slight lowering in its temperature without a substantial pressurization. When the condensed mass is completely in the liquid state, a continuous process can be used in condensing the low pressure vapor. When the condensed mass is a condensate-desublimate mixture, the tendency for the desublimate to adhere on the cold surface is reduced by the presence of the condensate (liquid). Even when the desublimate formed does adhere on the cold surface, a simple method to be described can be used in dislodging it from the cold surface.

That both A-component and B-component are vaporized in the first characteristic step and that their volatilities are close lead to the following advantages:

(1) The concurrent vaporization of both components enables withdrawal of a large amount of heat and results in formation of a large amount of B-solid.
(2) The vapor formed is a mixture containing substantial amounts of both components and can be transformed completely into a condensed mass by a slight lowering in temperature without a substantial pressurization. This temperature is higher than the eutectic temperature of the binary system.
(3) The mother liquor phase can be completely eliminated by continuing the first characteristic step to yield a uncontaminated B-solid.

BRIEF DESCRIPTION OF THE DRAWINGS

FIGS. 12, 13 and 14 illustrate equipments that can be used in conducting the basic distillative freezing process. Each of the equipments illustrated has a first processing zone in which concurrent vaporizations of the two components and simultaneous crystallization of B-solid take place and a second processing zone in which the low pressure vapor formed in the first zone is transformed into a condensed mass.

FIGS. 15 through 17 illustrate equipments that can be used in conducting the first modified process. Each of the equipments illustrated also has two processing zones. In the first zone of each of these units, concurrent vaporizations of the two volatile components can be continued to completely eliminate mother liquor phase.

FIG. 18 illustrates a system in which the second modified process can be conducted. The system includes a unit for vaporizing a binary liquid mixture, units for desubliming some B-components out of the vapor to form residual gas streams and units for transforming residual gas streams into condensed masses.

FIGS. 19 through 23 will be used in distinguishing systems to which a process of the present invention can be applied from systems to which separation processes of the prior art, such as a vacuum freezing process for desalination, a vacuum crystallization process, a vacuum drying process and a conventional desublimation process, can be applied.

DESCRIPTION OF PREFERRED EMBODIMENT OF THE INVENTION

1. A Brief Review of Phase Diagrams

The processes of the present invention have several basic unit operations. These unit operations can be well explained by referring to some phase diagrams.

The processes of the present invention can be used in separating a mixture containing at least two volatile components, irrespective of whether the two components form an azeotropic mixture or not. For simplicity, however, discussions will be presented by referring to mixtures each having components that do not form an azeotrope. However, the discussions presented can be extended and used for azeotrope forming mixtures.

Figure 1:
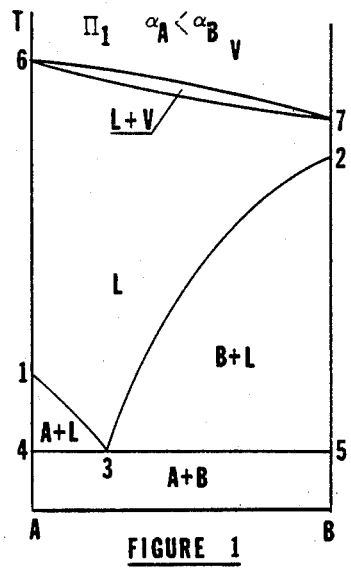
FIG. 1 illustrates a phase diagram of a first binary system containing two volatile components with close volatilities at a pressure higher than the triple point pressures of the components. In this binary system, the volatility ($\alpha_A$) of the first component (A-component) is less than that ($\alpha_B$) of the second component (B-component) and the melting temperature ($T_A$) of the first component is less than that of the second component ($T_B$).
Figure 2:
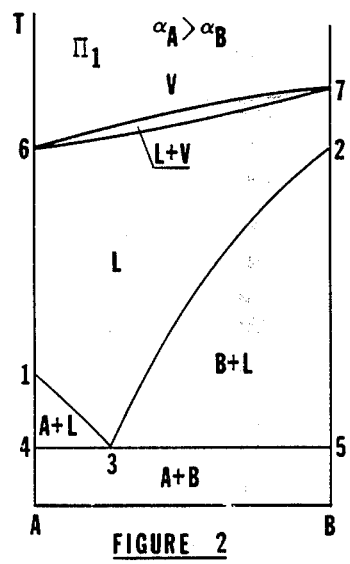
FIG. 2 illustrates a similar phase diagram for a second binary system in which the volatility ($\alpha_A$) of the first component is higher than that ($\alpha_B$) of the second component.

FIG. 1 illustrates a typical phase diagram of a binary system having two volatile components (A and B) at a pressure $\pi_1$ higher than the triple point pressure of the components. The figure shows a first freezing line 1-3 (saturated with A), a second freezing line 2-3 (saturated with B), an eutectic line 4-3-5, one eutectic point 3, and liquid-vapor lines 6-7. In the system illustrated, the volatility of B (denoted as $\alpha_B$) is higher than the volatility of A (denoted as $\alpha_A$). FIG. 2 illustrates a similar phase diagram for another typical binary system in which the volatility of A is higher than that of B. It is assumed that the volatilities of the two components are reasonably close to each other.

When a mixture of a composition in the range 3-5 is cooled and brought into the region 2-3-5, a part of B-component in the mixture crystallizes out. Therefore, for a mixture in the composition range 3-5, B-component is called the crystallizing component and A-component is called the non-crystallizing component. Conversely, for a mixture of a composition in the range 4-3, A-component and B-component are respectively the crystallizing component and the non-crystallizing component.

A binary mixture treated by the processes of the present invention is called either a Type 1 mixture or a Type 2 mixture according to whether the volatility of the crystallizing component is greater or less than the volatility of the non-crystallizing component. Therefore, mixtures in the range 3-5 of FIG. 1 and mixtures in the range 4-3 of FIG. 2 are Type 1 mixtures; conversely, mixtures in the range 4-3 of FIG. 1 and mixtures in the range 3-5 of FIG. 2 are Type 2 mixtures. In the following sections, a mixture in the range 3-5 of FIG. 1 will be used to represent a Type I mixture and a mixture in the range 3-5 of FIG. 2 will be used to represent a Type 2 mixture.

Figure 3:
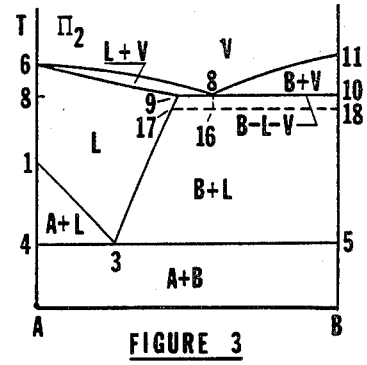
FIG. 3 illustrates a phase diagram of the first binary system taken at a pressure lower than the triple point pressure of B-component. This figure shows the existence of a three phase state having B-solid, liquid and vapor, the existence of a two phase (B-solid and vapor) region above the three phase temperature and the existence of a two phase (B-solid and liquid) region below the three phase temperature.

The phase diagram of the system of FIG. 1 taken at a pressure $\pi_2$ that is lower than the triple point pressure of B but higher than that of A is shown as FIG. 3. In the FIG. 3, one can see a B-solid-liquid-vapor line 9-8-10, denoted as a B-L-V three phase line, a B-solid-Vapor region 8-10-11, denoted as (B+V) two phase region and a B-solid-liquid region 9-10-5-3, denoted as (B+L) two phase region. The presence of the three phase line indicates that the liquid phase 9, the vapor phase 8 and the B-solid phase 10 can reach a three phase equilibrium state under pressure $\pi_2$ and temperature $T_8$. The pressure and temperature will be respectively referred to as a B-L-V three phase pressure and a B-L-V three phase temperature. It is seen that the (B+V) region and the (B+L) region are respectively above and below the B-L-V temperature. The presence of the B-solid-vapor region indicates that when a mixture of a composition in the range 8-10 is brought to a state represented by a point in the (B+V) region, it separates into a B-solid mass and a vapor mixture represented by a point on the saturated vapor line 8-11. A liquid phase does not exist in this region. A similar phase diagram of the system of FIG. 2 is shown as FIG. 5. In this figure, one can also see the presence of a B-L-V three phase line 8-9-10, a B-solid-vapor region 8-10-11 above the B-L-V temperature and a B-solid-liquid region 9-10-5-3 below the B-L-V temperature. By comparing the two three phase lines in these two figures, one notices that, for the Type 1 system, the equilibrium vapor 8 is richer in B than the equilibrium liquid 9 and that for the Type 2 system the reverse is true.

Figure 4:
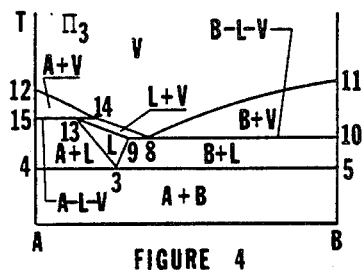
FIG. 4 illustrates a phase diagram of the first binary system taken at a pressure substantially lower than that of FIG. 3. There are a three phase (A-L-V) state wherein A-solid and liquid and vapor coexist, a two phase (A+V) region wherein A-solid and vapor coexist and a two phase (A+L) region wherein A-solid and liquid coexist at the A-rich end.
Figure 6:
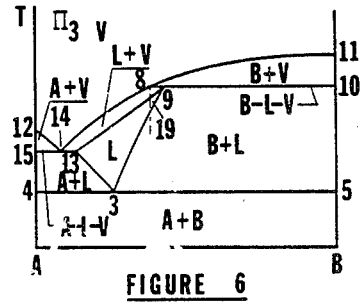

FIG. 4 shows the phase diagram of the system of FIG. 1 taken at a low pressure $\pi_3$ that is lower than the triple point pressure of A-component. In the figure, one can see another three phase line 15-13-14, denoted as an A-L-V line, another solid-vapor region, denoted as (A+V) region, and another solid-liquid region, denoted as (A+L) region in addition to those seen on FIG. 3. FIG. 6 shows a similar phase diagram for the system of FIG. 2. Again, one can see an A-L-V line 15-14-13, an (A+V) region and an (A+L) region. Descriptions similar to those given for the B-L-V lines, (B+V) regions and (B+L) regions can be given to these A-L-V lines, (A+V) regions and (A+L) regions.

Phase diagrams of systems to which processes of the present invention can be applied and phase diagrams of systems to which processes of the prior art can be applied will be compared in Section 6 by referring to FIGS. 19 through 23. Characteristic features of systems to which the present processes can be applied will also be presented in the Section.

2. Key Unit Operations of the Processes and Phase Diagrams

The processes of the present invention are closely related to the presences of the three phase lines and solid-vapor regions in the phase diagrams described. There are several key unit operations in these processes and important information about these unit operations can be obtained by studying these phase diagrams. These unit operations are described in this section.

(1) Three Phase Transformation (denoted as B-L-V operation)

In a basic distillative freezing process, a mixture is transformed into a solid, a mother liquor and a vapor mixture. These coexisting phases can be closely represented by the three phases on a three phase line.

(2) Solid-Vapor Region Transformation (denoted as (B+V) operation)

In a modified distillative freezing process, a mixture is transformed to a B-solid and a low pressure vapor mixture. Such a state can be represented by a point in the solid-vapor region of a phase diagram. There is no liquid phase under such condition and there is no need to separate solid from mother liquor. Therefore, a modified distillative freezing process will also be referred to as a solid-vapor region refining process.

(3) A Mixed Condensation-Desublimation Operation

As has been described, a solid, a mother liquor and a low pressure vapor mixture are formed from a feed mixture in the basic distillative freezing process. In order to maintain the processing system under the reduced operating pressure, the low pressure vapor has to be transformed into a condensed mass. It is desirable to accomplish this without substantially pressurizing the vapor. Let points 9, 8, 10 in FIG. 3 respectively represent the mother liquor phase, the vapor phase and the solid phase obtained in a three phase transformation of a Type 1 mixture. When the vapor 8 is cooled under the pressure $\pi_2$ to a temperature 16 which is slightly lower than the three phase temperature, it is transformed into a liquid (condensate) 17 and a solid (desublimate) 18. Therefore, this transformation is referred to as a mixed condensation-desublimation operation or, simply, a condensation-desublimation operation. It is noted that this operation is possible because the (B+V) region and the (B+L) region are respectively above and below the B-L-V temperature.

When a low pressure pure vapor is brought in contact with a cold surface so that the vapor desublimes, the solid formed (desublimate) adhers to the cold surface and interfers heat transfer. Therefore, there is a need to remove the desublimate frequently. It is fortunate that in a process of the present invention, the vapor formed is a mixture of A-component and B-component and a step of transforming the vapor to a condensed mass is either a mixed condensation-desublimation operation or a simple condensation operation. It is not a simple desublimation operation.

The desublimate formed in a condensation-desublimation operation in a process of the present invention has a much less tendency to adhere on the cold surface. This is because the desublimate/condensate ratio obtained is usually low and the condensate formed tends to wet the cold surface and prevent the desublimate from adhering to the cold surface. Referring to FIG. 3, the desublimate/condensate ratio is given by the ratio of $\overline{16\text{-}17}$ to $\overline{16\text{-}18}$. When a mixture containing close boiling components is treated by a process of the present invention, the vapor phase 8 and the liquid phase 9 are very close in compositions. Provided that a slight cooling is applied, points 16 and 17 are very close. Therefore, for such a close boiling system, the desublimate/condensate ratio is very small. One may draw the following important conclusion:

"The closer the volatilities of the components in a mixture treated by a distillative freezing process are, the smaller is the desublimate/condensate ratio obtained and the easier it is to carry out the condensation-desublimation operation."

In other words, "The closeness of the volatilities of the components of a mixture makes a distillation process used to separate it difficult; yet, it makes a distillative freezing process used to separate it easier."

When a mixture is subjected to a solid-vapor region refining process (a modified distillative freezing process), the vapor formed can be represented by any point on the saturated vapor line 8-11. However, in order to obtain a high yield of the B-solid, it is desirable that the vapor obtained be represented by a point close to the three phase point 8. Then, the conclusion stated above can also be applied to the solid-vapor region refining process.

(4) A Simple Condensation Operation

Figure 5:
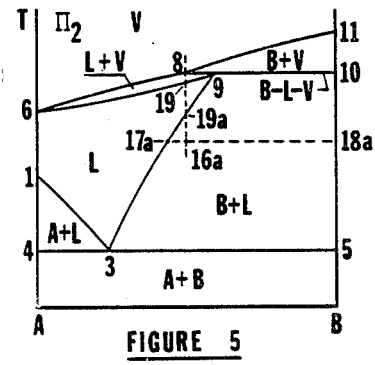
FIGS. 5 and 6 are similar to FIGS. 3 and 4 respectively and are phase diagrams for the second binary system. The phase diagram taken at an operating pressure of a system to which a distillative freezing process applies has a three phase (solid-liquid-vapor) temperature, a two phase (solid and vapor) region above the three phase temperature and a two phase (solid and liquid) region below the three phase temperature in the way illustrated by FIGS. 3 through 6.

Let the vapor, the mother liquor and the solid formed from a Type 2 mixture by a three phase transformation operation be represented by points 8, 9 and 10 in FIG. 5. When the vapor is cooled without being pressurized substantially, it condenses completely to form a condensate at the temperature of point 19. This operation is referred to as a simple condensation of the vapor mixture. That a simple condensation has taken place is due to the fact that the volatility of the non-crystallizing component ($\alpha_A$) is higher than that of the crystallizing component ($\alpha_B$) and because the (B+V) region and the (B+L) region are respectively above and below the B-L-V temperature.

It is noted however that when the condensate 19 is cooled down further to 16a, the condensate does separate into a solid and a liquid and the ratio of the two phases is $\overline{16a\text{-}17a}$ to $\overline{16a\text{-}18a}$. Letting, the intersection of line 19-16a and 3-9 be 19a, the range 19-19a is the range of undercooling in which a simple condensation can take place. When the volatilities of the two components are very close, the line segments 8-9, 8-19, and 19-19a are very short. Therefore, when the condenser temperature is not closely controlled, some solid deposition on the condenser wall will take place even though the mixture treated is a Type 2 mixture.

(5) Withdrawal of Heat of Crystallization

The three phase transformation step in a basic distillative freezing process may be conducted under an adiabatic condition. Therefore, the latent heat released in forming B-solid is mostly removed by vaporizing the A-component and B-somponent. Therefore, the fact that the non-crystallizing component is also volatile is helpful in the removal of heat of crystallization of B-solid.

3. Basic Distillative Freezing Process

Processing of a Type 1 mixture by the basic distillative freezing process comprises the following five steps:

(1) Step 1: Three Phase Transformation

In this step, a feed mixture is transformed into a low pressure vapor and a condensed mass that comprises a mother liquor and B-solid.

(2) Step 2: Purification of B-Solid

In this step, the B-solid in the condensed mass obtained in Step 1 is separated from the mother liquor and purified. The separated mother liquor constitutes a B-lean product.

(3) Step 3: Condensation-Desublimation

In this step, the low pressure vapor mixture obtained in Step 1 is cooled without being substantially pressurized and is transformed into a condensate-desublimate mixture.

(4) Step 4: Melting of Purified B-Solid

In this step, the purified B-solid obtained in Step 2 is melted to give a B-enriched product.

(5) Step 5: Melting of Desublimate

In this step, the desublimate obtained in Step 3 is melted. The condensate-desublimate is transformed into a liquid mixture which may also become a B-lean product. When a type 2 mixture is processed, the processing steps taken are substantially the same as those presented above except that Step 3 becomes a simple condensation operation and Step 5 may be eliminated. Each of the steps listed are explained in detail in this section.

The three phase transformation step may be conducted with heat addition, with heat removal, or under an adiabatic condition. When this step is conducted under a substantially adiabatic condition, the heat released in forming B-crystals is removed mainly by vaporizing portions of the A-component and B-component. The operation may be carried out either as a differential process or as an equilibrium process.

Figure 7:
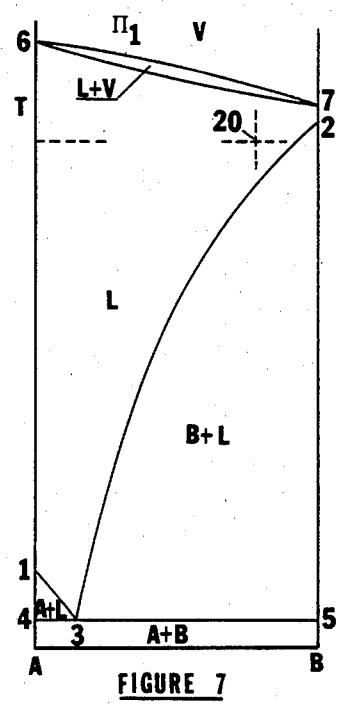
FIGS. 7 through 11 illustrate how phase diagrams of a binary system containing two volatile components vary as the pressure is reduced and will be used in explaining the progress of a distillative freezing process.

An equilibrium and adiabatic operation may be described by referring to FIGS. 7 through 11. The figures respectively show phase diagrams of a Type 1 system at successively lower pressures, $\pi_1$ through $\pi_5$. In order to describe the process in a concrete manner, let A and B be m-xylene and p-xylene respectively, and $\pi_1$, $\pi_2$, $\pi_3$, $\pi_4$, and $\pi_5$ be taken roughly as 6 mm $H_g$, 2.4 mm $H_g$, 0.8 mm $H_g$, 0.34 mm $H_g$, and 0.05 mm $H_g$. There is no three phase line and no (B+V) region in FIG. 7, since $\pi_1$ is higher than the triple point pressure of B. It is seen in the figures that the three phase line 9-8-10 increase its length and the (B+V) region 8-10-11 expands as the pressure decreases. A series of events that take place are described as follows:

(a) Let it be assumed that the feed is introduced under a condition represented by point 20 in FIG. 7. The feed is then in the liquid state.

Figure 8:
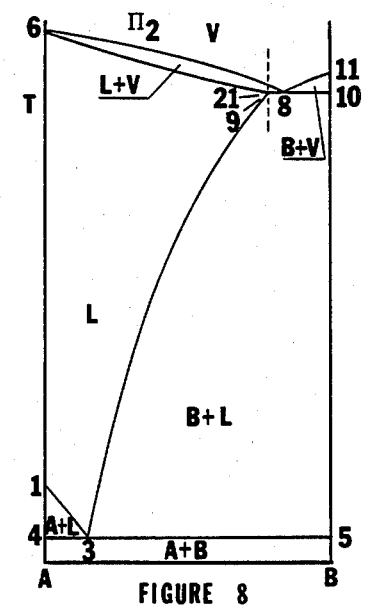

(b) Referring to FIG. 8, when the system pressure is reduced to $\pi_2$, the state of the mixture is represented by point 21 which coincides with the equilibrium liquid on the three phase line. A three phase transformation is initiated at this condition. A differential amount of vapor is formed and a differential amount of B-solid is formed.

Figure 9:
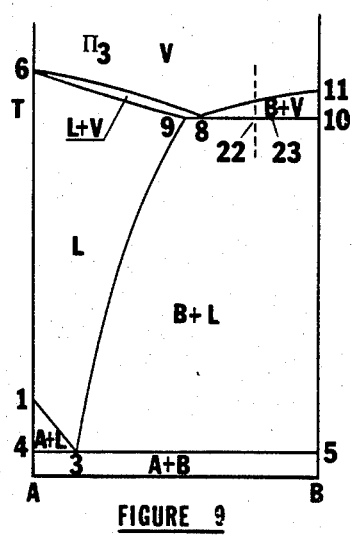

(c) Referring to FIG. 9, when the system pressure is reduced to $\pi_3$, the state of the mixture is represented by point 22. Substantial amounts of B-solid and vapor have been formed by this time. The ratio of the mass of B-solid ($S_3$) to the mass of vapor ($V_3$) is about equal to the ratio of latent heat of vaporization ($\lambda_V$) to latent heat of crystallization ($\lambda_f$) of B-solid and is represented by $\overline{8\text{-}23}/\overline{23\text{-}10}$. One may write $$\frac{S_3}{V_3} = \frac{\lambda_V}{\lambda_f} = \frac{\overline{8-23}}{\overline{23-10}} \quad (1)$$

The mother liquor mass ($L_3$) that remains is related to the sum of solid and vapor masses ($S_3+V_3$) by $$\frac{L_3}{S_3 + V_3} = \frac{\overline{22-23}}{\overline{9-22}} \quad (2)$$

One may find the masses of B-solid, mother liquor and vapor by using the above relations.

Figure 10:
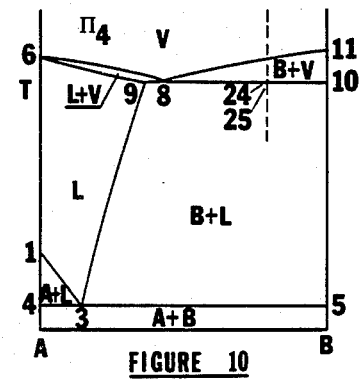

(d) Referring to FIG. 10, when the system pressure is reduced to $\pi_4$, the state of the mixture is represented by point 24. Let point 25 be such that $\overline{8\text{-}25}$ to $\overline{25\text{-}10}$ ratio is equal to $\lambda_V/\lambda_f$. It is seen that point 24 coincides with point 25 at this pressure. Since the mother liquor mass ($L_4$) is related to the sum of solid and liquid masses ($S_4+V_4$) by $$\frac{L_4}{S_4 + V_4} = \frac{\overline{24-25}}{\overline{9-25}} \quad (3)$$

and since $\overline{24\text{-}25}$ is zero, the mass of mother liquor is zero.

Figure 11:
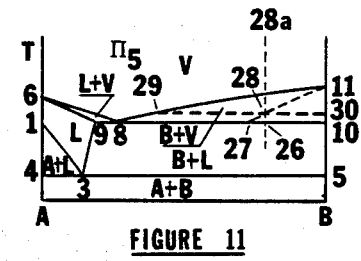

(e) Referring to FIG. 11, when the system pressure is further reduced to $\pi_5$, the state representing the mixture is represented by a point 28 within the (B+V) region. The mixture is separated into B-solid and vapor and the ratio of the masses $S_5/V_5$ is given by $\overline{29\text{-}28}/\overline{28\text{-}30}$.

For the feed given, a three phase transformation has to be conducted under a pressure between $\pi_2$ to $\pi_4$ and a solid-vapor region transformation step has to be conducted under a pressure lower than $\pi_4$.

When a mixture is subjected to an operation in which the vapor formed is removed as it is formed, the operation approaches a differential operation. A differential operation may be approximated by a number of equilibrium stage operations. As described above, when a given feed mixture is subjected to an equilibrium and adiabatic three phase transformation operation, the ratio of solid mass to vapor mass is substantially a definite value and the ratio of liquid mass to the combined mass of solid and vapor is a function of pressure. These ratios can be varied, however, by an addition of heat or a removal of heat. Therefore, it may be desirable to conduct this operation under a non-adiabatic condition in order to control these ratios. Descriptions of a three phase transformation conducted under a non-adiabatic and/or differential condition can be arrived at by modifying the descriptions given above for an equilibrium and adiabatic operation.

FIGS. 12, 13, and 14 illustrate equipments in which the basic distillative freezing process can be conducted. The processing unit illustrated by FIG. 12 has an insulated enclosure 31 and consists of a first processing zone 32 in which a three phase transformation operation can be conducted and a second processing zone 33 in which a condensation step or a condensation-desublimation can be conducted. The unit is connected to a vacuum pump through a conduit 34. A slurry pool 35 is present in the first zone and a spraying device 36 is used to spray the slurry into space so that the volatile components are vaporized from the droplets to form B-crystals within the droplets. The droplets fall on the pool. The second processing zone may or may not be compartmentized and contains working medium conduits 37. A working medium is contained in the conduits. There are troughs 38 placed under the working medium conduits and valving means 39, 40 are provided for each compartment.

A feed 41 is introduced into the first zone and is transformed into a low pressure vapor stream and a slurry that comprises a mother liquor and B-solid. The slurry stream 42 is removed from the unit and is separated into a mother liquor and purified B-solid. The mother liquor constitutes a B-lean product. The purified B-solid is melted and becomes a B-enriched product.

The low pressure vapor obtained in the first zone is admitted to the second zone and brought into a heat exchange relation with the working medium (a cooling medium) and is transformed into a condensed mass. The condensed mass may be completely in a liquid state or may be partly liquid and partly solid. In the latter case, the solid may or may not adhere to the conduit walls to interfer heat transfer. When a solid does adhere to the conduit walls, there is a need to remove it from the walls intermittently. It is therefore desirable to prevent an adhering solid phase from forming. However, when an adhering solid phase does form, one has to have a convenient way of removing it.

When a type 1 mixture is processed, the condensed mass is a condensate-desublimate mix and is partly solid and partly liquid. When the conduit walls are properly wetted and the desublimate/condensate ratio is low, the desublimate may not adhere to the walls. Then, it is possible to conduct the condensation-desublimation operation in a continuous manner. In order to prevent desublimate from adhering on the walls, one may recycle some liquid and apply it on the walls. It has been described that when a type 2 mixture is processed and when the cooling operation is properly controlled, the condensed mass is completely in liquid state. In this case, a simple condensation operation has taken place and the operation can be conducted in a continuous manner. Provided that an adhering solid phase does not form, the second processing zone does not have to be compartmentized and the valving means 39, 40 shown are not needed.

However, when an adhering solid phase does form on the walls, it has to be deslodged from the walls at least intermittently. The second processing zone is compartmentized and valving means are provided in each compartment for the purpose of melting at least a part of the adhering solid and dislodging it from the walls. While this operation is in progress in a compartment, the compartment is pressure isolated from the first zone and the vacuum conduit and a heating medium is introduced into the medium conduits. As this process takes place, the pressure in the compartment increases. The pressure increase is accomplished by vaporizing a small amount of the condensed mass in the compartment. That the compartment pressure increases is explained as follows:

There are solid, liquid and vapor existing in the compartment. As the adhering B-solid is melted, the liquid phase becomes richer in B-component. Under the solid-vapor-liquid equilibrium conditions, the system pressure and the liquid composition are related. It can be seen from the way compositions of liquids 9 varie in FIGS. 8 through 11 that the system pressure increases as the liquid phase becomes richer in B-component. Therefore, the compartment pressure has to rise as adhering B-solid is melted.

The processing unit illustrated by FIG. 13 can be used when a mixture is processed in such a way that no solid phase adheres to the cold surface. It has an insulated enclosure 44 and has a first processing zone 45 and two second processing zones 46. Conduits 47 are provided at the second processing zones to evacuate the unit. Vaporization trays 48 containing liquid 49 are installed in the first zone and working medium conduits 50 are provided in the second processing zone. Baffles 51 are provided to provide a storage for a condensate or condensate-desublimate. In operation, a feed is added to the trays and the system pressure is reduced. The feed is transformed into a low pressure vapor mixture and a slurry. The slurry is removed from the trays, separated into a purified B-solid and a mother liquor. The melt of the purified B-solid and the mother liquor respectively become a B-enriched product and a B-lean product. The low pressure vapor is either transformed into a condensate or a condensate-desublimate and removed 52 from the system to become a B-lean product.

FIG. 14 illustrates a system in which multistage operation can be conducted. The unit illustrated has six sub-units 53 through 58 each having a first zone and a second zone. Feed 61 is introduced into the first zone of the first unit and transformed into a first vapor and a first slurry. The first slurry is transformed into a second vapor and a second slurry in the second sub-unit, etc., The sixth vapor and the sixth slurry 62 are formed in the sixth sub-unit 58. The sixth slurry is separated into a purified B-solid and mother liquor. A cooling medium 63 is introduced into medium conduits 59 that pass through the second zones of the sub-units and is discharged 64 from the left end. The six vapor streams are transformed into condensates or condensates-desublimates which are discharged at the right end 65.

4. First Solid-Vapor Region Refining Process

In the first solid-vapor region refining process, a mixture containing at least two volatile components, respectively denoted as A-component and B-component, is brought to a two phase (solid-vapor) condition under which a solid phase mass of the B-component coexists with a vapor mixture of the components. The liquid phase mass is completely or substantially completely eliminated to thereby transfer all or substantially all of the A-component in the feed to the vapor mixture and free the solid phase from adhering liquid phase. The purified B-solid becomes a purified B-product on melting; the vapor mixture is transformed into a liquid and becomes a B-lean product.

In this process one may feed a liquid mixture containing volatile components or a solid-liquid mixture that already contains B-solid. It is advantageous to use a fractional solidification operation in combination with a first solid-vapor region refining operation. Combined operation may be conducted in the following ways:

(a) One may subject a feed mixture to a fractional solidification operation to obtain a solid-liquid mixture and subject the entire solid-liquid mixture to a first solid-vapor region refining operation.

(b) One may subject a feed mixture to a fractional solidification operation to obtain a solid-liquid mixture, remove a part of the liquid phase and subject the remaining mixture to a first solid-vapor region refining operation.

(c) One may subject a feed mixture to a fractional solidification operation to obtain a solid-liquid mixture, separate the mother liquor and purify the solid by a washing operation and then subject the resulting purified solid-liquid mixture to a first solid-vapor region refining operation.

A first solid-vapor region refining operation may be considered as an extension of a basic distillative freezing operation. In the basic distillative freezing process, the components of a liquid mixture containing at least two volatile components (denoted as A-component and B-component) are concurrently vaporized under a condition that a solid phase mass of B-component coexists with the liquid. A first solid-vapor region refining operation results when a basic distillative freezing operation is continued until the liquid phase mass is completely or substantially completely eliminated. However, it is noted that there are major differences in the primary objectives of the two processes. The primary objective of a basic distillative freezing process is produce a large amount of B-solid. Therefore, it is advantageous to conduct the process under an adiabatic condition to enhance the formation of B-solid. The primary objective of a first solid-vapor region refining process is to free B-solid from adhering liquid and transfer substantially all of the A-component into the vapor phase. Therefore, when a feed processed already contains a large amount of B-solid, it may be a greater concern to keep the operating condition within a desirable range than to form an additional amount of B-solid. This can be accomplished by a proper supply of heat. With a proper supply of heat, one can maintain the liquid composition within a narrow range and control the operating condition within the desired range. Operated in this manner, most of the latent heat of vaporization is supplied by the heat input rather than by the formation of B-solid. A small amount of B-solid may be dissolved or formed in order to maintain the liquid composition within the narrow range.

Processing of a Type 1 mixture or a solid-liquid mixture containing a Type 1 liquid comprises the following four steps:

(1) Step 1: Solid-Vapor Region Transformation

In this step, a feed mixture is transformed into a low pressure vapor and a purified B-solid.

(2) Step 2: Condensation-Desublimation

In this step, the low pressure vapor mixture obtained in Step 1 is cooled without being substantially pressurized and is transformed into a condensate-desublimate.

Some of the desublimate formed may adhere to the cold surface.

(3) Step 3: Melting of Purified B-Solid

In this step, the purified B-solid obtained in Step 1 is melted to give a very pure B-product.

(4) Step 4: Melting of Desublimate or Adhering Solid

In this step, the desublimate or adhering solid obtained in Step 2 is melted. The condensate-desublimate is transformed into a liquid mixture which constitutes a B-lean product.

When a type 2 mixture is processed, step 2 may become a simple condensation step and step 4 is no longer needed. It is noted that step 2 and 4 of this process are respectively similar to steps 3 and 5 of the basic distillative freezing processes. Therefore, descriptions of these steps can be omitted. Descriptions of Steps 1 and 3 are given in some detail in the following paragraphs.

For a given feed, the operating conditions of a first solid-vapor region refining operation can be selected in the following way:

(1) Choose the operating pressure such that the cooling medium temperature available is sufficiently cold to transform the low pressure vapor into a condensed mass.

(2) Choose a temperature that is slightly higher than the three phase temperature at the selected operating pressure as the operating temperature.

The yield of purified B-solid obtainable and the heat imput needed or the heat removal required can then be found in the following manner. Let the average composition of the feed be represented by point 20 in FIG. 7 and let the operating pressure be $\pi_5$. Draw a constant temperature line at the operating temperature and let its intersection with the saturated vapor line 8-11 be 29 and its intersection with the B-line be 30. Then draw a constant composition line through point 20 and let its intersections with the three phase line at $\pi_5$ and the constant temperature line 29-30 be points 26 and 28 respectively. Letting the feed be F, the amounts of B-solid and vapor that exist after the system reaches equilibrium be S and V respectively, one obtains the following relations:

$$\frac{S}{F} = \frac{\overline{29 - 28}}{\overline{29 - 30}} \quad (4)$$

$$\frac{V}{F} = \frac{\overline{28 - 30}}{\overline{29 - 30}} \quad (5)$$

$$\frac{S}{V} = \frac{\overline{29 - 28}}{\overline{28 - 30}} \quad (6)$$

The heat imput required Q/F per unit mass of feed is then given by $$\frac{Q}{F} = \frac{V}{F} \cdot (H - h_F) - \frac{S}{F} \cdot (h_F - h_s) \quad (7)$$

where H and $h_s$ are enthalpies per unit mass of the vapor and B-solid respectively, and $h_F$ is the average enthalpy per unit mass of the feed. By referring to equation (4) and FIG. 11, it is seen that yield of B-solid increases as the operating temperature is brought closer to the three phase temperature.

When a mixture is subjected to an operation in which the vapor formed is removed as it is formed, the operation approaches a differential operation. The mixture first undergoes a differential B-L-V three phase transformation until the residual liquid is completely eliminated. Both the composition of the vapor removed and the composition of the residual liquid change with time. A differential operation may be approximated by a number of equilibrium stage operations.

While melting of purified B-solid takes place, the pressure of the zone has to be raised to a pressure higher than the triple point pressure of B-component. It will be shown that by pressure isolating the zone and by introducing a heating medium, a small amount of B-component vaporizes and accomplishes the desired pressure increase. Melting then takes place in the zone. No compressor is needed in this operation.

FIG. 15 illustrates a unit in which a solid-vapor region process can be conducted. It comprises an insulated enclosure 66, a heat conducting wall 67 enclosing several conduits 68 which contain a heat transfer medium, heat transfer tubes 69 containing a heat transfer medium, sliding valving means 70, and evacuating conduit with a valve 71 connecting the enclosure to a vacuum pump 72. The enclosure is separated by the sliding valve means, into a first processing zone which is below the valve means and a second processing zone which is above the valve means. Step 1 and Step 3 are conducted in the first zone and Step 2 and Step 4 are conducted in the second zone.

The operational procedures are described by referring to processing of a Type 1 binary liquid mixture in which the volatility of the crystallizing component is higher than that of the non-crystallizing component. Feed $L_1(A+B)$ 73 is introduced in the enclosure to form a layer of the mixture 74; a heating medium, a cooling medium or none is passed through the conduits to maintain the mixture at the desired operating condition; a cooling medium is passed through the conduits 69; the vacuum pump is actuated. A low pressure vapor $V_2(A+B)$ is formed, leaves the first zone and enters the second zone and is condensed and desublimed into a mixture of $M_2(A+B)$ containing B-solid and a liquid mixture. As the low pressure vapor leaves the mixture in the first zone, B-solid begins to form. In other words, the liquid mixture is transformed into B-solid and the low pressure vapor. The operations in the two zones are continued until the liquid phase in the first zone is substantially completely eliminated. It is seen that, during this period, Step 1 and Step 2 are simultaneously conducted in the two zones. The sliding valve means 70 and the valve provided on the evacuating conduit 71 are then closed so that two zones are isolated from the vacuum line and are isolated from each other. Heating mediums are passed through conduits 68 and 69 to cause melting of the B-solid in the two zones. It is seen that during this period, Step 3 and Step 4 are respectively conducted in the two zones and the pressures in these two zones are raised by vaporizing small amounts of the components in these zones. The pressure in the first zone is higher than the triple point pressure of B-component and the pressure increase is due mainly to vaporization of B-component. The purified B-liquid that is formed in the first zone and the B-lean liquid that is formed in the second zone are removed from the two zones to become two products L(B) and $L_2(A+B)$ respectively. The operations described complete a cycle and next cycle is initiated.

When a mixture processed is a Type 2 mixture in which the volatility of the crystallizing component is less than that of the non-crystallizing component, there may be no need for Step 4. Therefore, while Step 3 is conducted in the first zone, the second zone is in an idle condition.

The unit of FIG. 15 may also be used to process a feed that already contains B-solid. One simply introduces a mixture of B-solid and liquid instead of a liquid feed. Other operational steps are the same. One may also introduce a liquid feed $L_0(A+B)$ and transform it into a mixture of B-solid and a liquid mixture by an indirect freezing operation, prior to initiating the operating procedures for the solid-vapor region refining process. In carrying out this extra step, one closes the sliding valve to isolate the first zone from the second zone, introduces a feed into the first zone, introduces a cooling medium into conduits 68 to remove heat from the mixture and form B-solid therein. The procedures described are then followed.

The unit illustrated by FIG. 16 has an insulated enclosure 77 and is divided into three sub-units 78, 79, 80 by partitions 81, 82. Each sub-unit has a first processing zone 83 at the center and two second processing zones 84 at the two sides. There are several heat conductive plates 85 containing conduits for working mediums. There are heat transfer tubes 86 in the second zones. The two zones are separated by sliding valving means 87. In operation, a feed mixture 88 is introduced to the heat conductive plates 85 and is cooled to the desired temperature. On evacuating the unit, a low pressure vapor is formed from the feed and B-crystals are formed. This operation is continued until the liquid phase is completely eliminated. The low pressure vapor is admitted to the second zone through the sliding valving means 87 and is either condensed or condensed and desublimed. When these operations are completed, these zones are isolated from each other by closing the sliding valving means and are isolated from the vacuum pump. Heating mediums are introduced into the conduits in the first zone and the heat transfer tubes in the second zone to melt the B-solid and desublimate in the two zones respectively. Again, pressures in these two zones are raised during this period and the pressure increases are caused by pressure isolation of the zones and vaporization of one or more components in the zones. The melt of the B-solid 89 and the liquid formed in the second zone 90 respectively become a purified B product and a B-lean product.

FIG. 17 illustrates a unit in which a solid-vapor region transformation operation can be conducted continuously. It is somewhat similar to a rotary disk dryer. It has an insulated enclosure 91 and has a first zone 92 and a second zone 93. These two zones are separated by louvered partitions 94. There are rotating disks 95 attached to a rotating shaft 96 in the first zone and there are heat transfer tubes 97 in the second zone. In operation, a feed 98 is added on the first disk and the content on a disk is continually transferred to the next lower disk. As the content moves through the unit downward, a low pressure vapor is formed and the vapor is transformed to a condensed mass in the second zone. Purified B-solid 99 is removed from the unit at the bottom of the unit. The condensed mass 100 obtained in the second zone is removed at the bottom of the unit. When it is desired either to supply heat or remove heat from the contents on the trays, one may provide heat transfer conduits at the bottom parts of these trays.

One may also conduct a solid-vapor region transformation in a spraying system. The system comprises a spraying zone which comprises a large empty space and a spraying device and a condensation or condensation-desublimation zone which contain heat transfer tubes containing a cooling medium. In operation, a feed, either a liquid mixture $L_1(A+B)$ or a mixture containing a liquid mixture and some B-solid $S(B)+L_1(A+B)$ is sprayed to form small droplets in the spray processing zone, which is maintained at a low pressure by the cooling in the condenser or condenser/desublimer and a vacuum pump. The liquid mixture is converted into a low pressure vapor $V_1(A+B)$ and B-solid, and the B-solid is collected at the bottom of the zone. The B-solid is transferred through a conveyor into a mixer, wherein it is mixed with a recycle B-liquid stream to become a slurry. The slurry is sent to a melter and is converted into pure B-liquid. A part of this liquid is discharged from the unit as a purified B-product and the remainder is recycled to the mixer. The low pressure vapor is converted into a condensed mass in the condenser or condenser-desublimer. When the condensed mass contains some B-solid, an additional step is needed to melt the B-solid. This may be done in the way described in connection with the second zone of FIG. 15. It is noted that by the nature of the spray processing operation, the solid-vapor region transformation is conducted in an adiabatic manner.

5. Second Solid-Vapor Region Refining Process

The second solid-vapor region refining process is another modified process of the basic distillative freezing process. Processing of a Type 1 mixture comprises the following five steps:

(1) Step 1: Complete Vaporization Step

In this step, a feed is vaporized and a low pressure vapor mixture is obtained.

(2) Step 2: Partial Desublimation

The low pressure vapor mixture is cooled at a pressure lower than the triple point pressure of B-component to thereby desublime a part of the B-component. As the results of this operation, the vapor is transformed into a purified B-solid and a residual vapor mixture. Substantially all of the A-component in the feed is in the residual gas mixture.

(3) Step 3: Condensation-Desublimation of the Residual Vapor Mixture

In this step, the residual vapor mixture obtained in Step 2 is further cooled down and is transformed into a condensate-desublimate mixture.

(4) Step 4: Melting of the Purified B-solid

In this step, the purified B-solid obtained in Step 2 is melted to give a very pure B-product.

(5) Step 5: Melting of Desublimate or Adhering Solid

In this step, the desublimate or adhering solid obtained in Step 3 is melted. The condensate-desublimate is transformed into a liquid mixture which constitutes a B-lean product.

When a type 2 mixture is processed, a simple condensate may be obtained in Step 3, and Step 5 is not needed. However, when an adhering solid is formed in Step 3, Step 5 is needed to dislodge the adhering solid.

Step 2 and 3 above may be explained by referring to FIG. 11. Let the low pressure vapor formed in Step 1 be represented by point 28a. When the vapor is cooled under $\pi_5$ so that its temperature becomes that of point 28, it separates into the residual vapor (V$_5$) 29 and B-solid (S$_5$) 30 in the ratio of $\overline{28\text{-}30}$ and $\overline{29\text{-}28}$. The residual vapor is then cooled below the three phase temperature and is transformed into a condensate-desublimate.

FIG. 18 illustrates a system in which the second solid-vapor region refining process can be conducted. The system comprises a vaporizer 101, one or more desublimer-melters 102a, 102b, and one or more condensers or one or more condenser-desublimer-melters 103a, 103b. In the process, a feed 109 is vaporized in the vaporizer 101 by heating medium 110 and 111. The vapor is depressurized through valve 105 and introduced to one or more of the desublimer-melters through one or more of the valves 106a and 106b. Let it be assumed that desublimation is taking place in unit 102a and melting is taking place in unit 102b. Then, valves 106a and 107a are open and valves 106b and 107b are closed, and a cooling medium 114a, 115a and a heating medium 114b, 115b are respectively passed through units 102a and 102b. B-solid is formed on the outer surfaces of the heat transfer tubes in unit 102a and the low pressure vapor becomes lean in B-component. This B-lean vapor $V_2(A+B)$, denoted as a residual vapor, is sent to condenser or condenser-desublimer-melter 103a or 103b. Let us assume that the unit 102b has gone through a desublimation operation and has a layer of B-solid on the tube surface. With valves 106b and 107b closed, a heating medium 114b, 115b is passed through the unit to thereby vaporize a small amount of B-component to raise the pressure to a pressure equal to or greater than the triple point pressure of B-component and melt the B-solid. The melt 112b is the refined B-liquid L(B). The two operations are alternatively conducted in units 102a and 102b to send residual vapor mixture to units 103a and 103b and produce defined B-liquids 112a and 112b. Each of the units 103a and 103b receives residual vapor, transforms it into a condensate-desublimate mix and then melt it in the way the second zone of the system of FIG. 15 operates and discharges a B-lean liquid $L_2(A+B)$. A cooling medium and a heating medium 116a, 117a, 116b, 117b are used in these operations. When the feed is a type 2 mixture, the units 103a and 103b serve as condensers and transform the residual vapor into a B-lean liquid.

6. Features that Differentiate the Present Processes from the Processes of the Prior Art It is important to distinguish a process of the present invention from (a) a vacuum freezing process for desalination, (b) a conventional desublimation process for removing a component from a gas mixture, (c) a vacuum crystallization process, and (d) a vacuum drying process. A process of the present invention differs from the processes of the prior art in (1) the types of mixtures processed, and (2) the operating procedures. These differences are explained in this section. FIGS. 19 through 23 illustrate phase diagrams for type 1 through type 5 systems. A process of the present invention is to be applied to mixtures that belong to type 1 and type 2 systems; a vacuum freezing desalination process is applied to mixtures that belong to type 3 systems; a conventional desublimation process is used for mixtures that belong to type 4 system; a vacuum crystallization process and a vacuum drying process are used for mixtures that belong to type 5 system.

FIGS. 19-a through 23-a show P-T projections of P-T-C space phase models of Type 1 through Type 5 system. Each figure shows the triple point of A 118 (denoted as $O_A$ point), triple point of B 119 (denoted as $O_B$ point), vaporization lines of A and B 118-121 and 119-124, melting lines of A and B 118-122 and 119-125, the four phase (A-enriched solid, B-enriched solid, liquid and vapor) point 120 (denoted as E-point or A-B-L-V four phase point), the three phase (A-enriched solid, liquid and vapor) line 118-120 (denoted as A-L-V line), the three phase (B-enriched solid, liquid and vapor) line 119-120 (denoted as B-L-V line), the three phase (A-enriched solid, B-enriched solid and liquid) line 120-127 (denoted as A-B-L line), the three phase (A-enriched solid, B-enriched solid, and vapor) line 120-128 (denoted as A-B-V line).

It has been found convenient to use "the characteristic vapor pressure ratio of a system" and "the characteristic latent heat ratio of a system" in the following discussions. The characteristic vapor pressure ratio of a system is defined as the ratio of the vapor pressure of the non-crystallizing component to that of the crystallizing component, both being evaluated at the triple point temperature of the crystallizing component. The characteristic vapor pressure ratios of the systems illustrated are the ratios of the pressures at points 130 to the pressures at points 119 in the figures. Referring to FIG. 20-a, when the $O_A$ temperature is higher than the $O_B$ temperature, the vaporization line of A-component has to be extended below the $O_A$ temperature in evaluating the vapor pressure of A-component at the $O_B$ temperature. The characteristic latent heat ratio is defined as the ratio of the latent heat of sublimation and the latent heat of melting of B-component evaluated at the $O_B$ temperature. For example, the characteristic latent heat ratios for water, benzene and p-xylene are about 8.5, 3.48 and 4.44 respectively.

Pertinent features that can be drawn from FIGS. 19-a through 23-a are described as follows:

(i) The Component Volatilities and the Characteristic Vapor Pressure Ratios

In a Type 1 system, both components are volatile, the volatility of the crystallizing component is greater than that of the non-crystallizing component. The characteristic vapor pressure ratio is less than one but is not near zero.

In a Type 2 system, both components are also volatile and the volatility of the crystallizing component is less than that of the non-crystallizing component. The characteristic vapor pressure ratio is greater than one and is a relatively small value that is nearly equal to or less than the characteristic latent heat ratio.

In a Type 3 system, the non-crystallizing component is substantially non-volatile. Therefore, the characteristic vapor pressure ratio is nearly equal to zero.

In a Type 4 system, both components are volatile and the volatility of the non-crystallizing component is much greater than that of the crystallizing component. The characteristic vapor pressure ratio is a rather large value that is greater than the characteristic latent heat ratio.

In a Type 5 system, the crystallizing component is substantially non-volatile. The characteristic vapor pressure ratio is a very large value and is much greater than the characteristic latent heat ratio.

(ii) The P-T Slopes of the B-L-V Lines

The P-T slopes of the B-L-V lines 119-120 for Type 1, Type 2, and Type 3 systems are positive at least near the $O_B$ points. Whereas, the P-T slopes of the B-L-V lines for the Type 4 and Type 5 systems are negative at least near the $O_B$ points.

By making a thermodynamic analysis one can derive an equation relating pressure to temperature of the B-L-V line. For ideal systems in which one may assume that (i) the ideal solution rule (Lewis and Randal Rule) applies to the liquid phase, (ii) the ideal gas law applies to the gas phase and (iii) solubility of A-component in B-solid is negligible, one may arrive at the following conclusions:

(a) the P-T slope of the B-L-V line near the $O_B$ temperature is positive when the characteristic vapor pressure ratio is less than the characteristic latent heat ratio; and (b) the P-T slope of the B-L-V line near the $O_B$ temperature is negative when the characteristic vapor pressure ratio is greater than the characteristic latent heat ratio.

For actual systems, the conclusions described may have to be slightly modified to allow for deviations from the assumptions made. For instance, a system in which the characteristic vapor pressure ratio is slightly greater than the characteristic latent heat ratio may have a B-L-V line that has a positive P-T slope. Conversely, a system in which the characteristic vapor pressure ratio is slightly less than the characteristic latent heat ratio may have a B-L-V line that has a negative P-T slope. Keeping in mind that adjustments are required to allow for departures from the assumptions made in deriving the P-T slope of a B-L-V line, the conclusions presented are very useful in determining what type of a system a mixture belongs to and whether a mixture can be successfully processed by a process of the present invention. Noting that the characteristic latent heat ratio of a substance is generally less than 10, it may be stated that the characteristic vapor pressure ratio of a mixture that can be processed by a process of the present invention is in the range of 0.1 to 10.

(iii) Intersections of Constant Pressure Cross-Sections with Three Phase Lines

Referring to FIGS. 19-a through 21-a, it is seen that the constant pressure cross-section of a P-T-C phase model that belongs to Type 1, Type 2 or Type 3 system taken at a pressure on the B-L-V line (pressure at point 129) intersects with the A-B-L line (at point 132). Referring to FIGS. 22a and 22b, it is seen that similar cross-section of a P-T-C phase model that belongs to Type 4 or Type 5 system intersects with the A-B-V line (at point 133).

FIG. 19-b illustrates a constant pressure cross-section of the P-T-C space phase model of a Type 1 system illustrated by FIG. 19-a taken at a pressure that intersects with the B-L-V line at point 129. Such a pressure is denoted as a B-L-V three phase pressure. FIGS. 10-b through 23-b illustrate similar cross-sections for the Type 2 through Type 5 systems of FIGS. 20-a through 23-b. Pertinent features that can be drawn from FIGS. 19-b through 23-b are described in the following section.

(iv) The (B-L-V) Three Phase Temperature and the (B+V) Two Phase Region

In each of the FIGS. 19-a through 23-a, there exists a B-L-V three phase temperature 129 at which B-solid, liquid and vapor coexist, and there exist a (B+V) region, a (B+L) region and an (L+V) region around the three phase temperature. A special attention is called to the size of the (B+V) region, the position of the (B+V) region relative to the (B-L-V) temperature and the position of the (B+L) region relative to the (B-L-V) temperature in each figure.

Referring to FIG. 19-b, it is seen that, in a Type 1 system, a substantial (B+V) region exists above the (B-L-V) temperature 129 and a (B+L) region exist below the (B-L-V) temperature 129. Because of the locations of the (B+V) and (B+L) regions relative to the (B-L-V) temperature, a vapor 134 formed in a B-L-V three phase transformation can be transformed into a condensed mass completely without a substantial pressurization by a small drop in temperature (to point 135) by a simultaneous condensation-desublimation operation. Because the (B+V) region covers a wide concentration range, a feed mixture within a wide concentration range can be processed by the basic distillative freezing process and the solid-vapor region refining processes of the present invention.

Referring to FIG. 20-b, it is seen that, in a Type 2 system, a substantial (B+V) region exists above the (B-L-V) temperature 129 and an (L+V) region and a (B+L) region exist below the (B-L-V) temperature 129. Because of the locations of the (B+V) region and the (L+V) region relative to the (B-L-V) temperature, a vapor 136 formed in a B-L-V three phase transformation can be transformed into a condensed mass completely without a substantial pressurization by a small drop in temperature (to point 137) by a simple condensation operation. Again, because the (B+V) region covers a wide concentration range, a feed mixture within a wide concentration range can be processed by a process of the present invention.

Referring to FIG. 21-b, it is seen that, in a Type 3 system, a two phase (B+V) region 138 is practically non-existing in the phase diagram. Therefore, when a type 3 mixture is subjected to a simultaneous flash vaporization and formation of B-solid, the vapor formed is substantially pure B-component and is desublimed on cooling. Because a two phase (B+V) region does not exist in the phase diagram, a Type 3 mixture can not be processed by the solid-vapor region refining operations.

Referring to FIG. 22-b, it is seen that, in a Type 4 system, a large two phase (B+V) region exist below the (B-L-V) temperature 129 and a two phase (B+L) region and a two phase (L+V) region exist above the three phase (B-L-V) temperature. Because the (B+V) region exist below the (B-L-V) temperature, a vapor formed by a three phase B-L-V transformation has to be cooled to a very low temperature 139 which is lower than the three phase (A-B-V) temperature 133, which in turn is lower than the four phase (A-B-L-V) temperature 120. A type 4 gas mixture can be processed by a conventional desublimation process for recovering the crystallizing component. In such a process, no attempt has been made to transform the residual gas to a condensed mass completely.

Referring to FIG. 23-b, it is seen that, the phase diagram of a Type 5 system is similar to that of a Type 4 system except that a saturated vapor is pure A. A Type 5 mixture can be processed by a vacuum crystallization process and a vacuum drying process. The vapor formed is substantially pure A-component and is usually either compressed and condensed or compressed and discharged. In order to transform the vapor into a condensed mass completely without a substantial pressurization, it has to be cooled to a very low temperature 140 that is lower than the three phase (A-B-V) temperature 133, which in turn is lower than the four phase temperature 120.

Key features that distinguish a process of the present invention from conventional processes are as follows:
(1) It applies to a mixture that belongs to a system which has a substantial two phase (B+V) region above the three phase (B-L-V) temperature under a three phase (B-L-V) pressure.
(2) In a solid-vapor region refining process, a mixture is brought into a two phase (B+V) region by completely eliminating the mother liquor phase.
(3) The vapor formed in a three phase (B-L-V) transformation or a solid-vapor region refining operation is transformed into a condensed mass by a small drop in temperature without a substantial pressurization. The temperature at which this operation is conducted is higher than the A-B-L-V four phase temperature and is higher than the normal eutectic temperature of the system.

7. Concluding Remarks

A process of the present invention has the following characteristic steps:
(1) Transforming a mixture into a low pressure vapor and a solid of the crystallizing component.
(2) Transforming the low pressure vapor into a condensed mass.

The operating pressures and operating temperatures of these steps are generally lower than the triple point pressure and temperature of the crystallizing component. Table 1 lists triple point temperatures and pressures of various substances. The values listed are estimated from vapor pressure values listed in "Handbook of Chemistry and Physics", by The Chemical Rubber Company. In the Table, substances are classified into three classes: Class 1 substances have the triple point pressures greater than 10 mm Hg, Class 2 substances have triple point pressures in the range of 1 mm Hg to 10 mm Hg and Class 3 substances have triple point pressures less than 1 mm Hg. It is seen that a large volume of vapor has to be handle in these steps and the volume of vapor to be handle increases as the triple point pressure of B-component decreases.

It is noted that a large volume of low pressure vapor is formed in the first zone, travels to the second zone, and is transformed into a condensed mass in the second zone. The flow of the low pressure vapor can be handled efficiently in an equipment that has the following features:
(1) A first zone and second zone being placed closely so that the vapor travels only a short distance.
(2) A large cross sectional area per unit mass flow rate is provided. A processing unit may have many interlaid first zones and second zones. It is noted that equipments illustrated by FIGS. 12 through 17 can meet these requirements and the features described have to be incorporated in the system of FIG. 18. As the operating pressure decreases, the volume rate of flow increases. Therefore, the cross sectional area per unit mass flow has to be increased and vapor travel path has to be shortened.

Some important applications of the processes of the present invention are described as follows:
(1) Production of high quality p-xylene from a mixture containing impurities such as m-xylene, o-xylene, and ethyl benzene.
(2) Production of high quality styrene from a mixture containing styrene and ethyl benzene.
(3) Purification of terephthalic acid to obtain high purity terephthalic acid that can be used directly in manufacturing polyester without being first transformed into dimethyl terephthalate.
(4) Purification of dimethyl terephthalate for use in manufacturing polyester.
(5) Concentration of aqueous solution of ethyl alcohol to produce high concentration ethyl alcohol.
(6) Production of high grade ethylene from a mixture containing ethylene and ethane.
(7) Separation of butadiene from butylene and butane.
(8) Purification of silane.
(9) Purification of aluminum chloride.

It is important to note that many chemicals of industrial importance belong to Class 2 and Class 3 in Table 1. Operating pressures for purifying these chemicals are rather low. Therefore, it is important to use equipments that can handle such low operating pressures.

It is noted that a distillative freezing process and its modified processes work particularly well in combination with a regular distillation process. For example, a close boiling mixture may be produced in the regular distillation process and is further processed by a solid-vapor region refining operation to yield a high purity product.

It is very important to note that the energy consumption and equipment cost of a distillative freezing process are much less than those of a comparable distillation process in many cases. Therefore, the distillative freezing process may be used to replace the distillation process even when the distillation process work well. For example, separation of an ethanol-water mixture to obtain a concentrated solution containing 50% ethanol can be accomplished by distillation without difficulty. However, a great energy conservation can be accomplished and the loss of ethanol in the water-rich product can be greatly reduced by adopting the distillative freezing process.

TABLE 1

Classification of Substances According to Triple Point Pressure

| | Substance | Triple Point Temperature (°C.) | Triple Point Pressure (mm Hg) |
|---|---|---|---|
| Class 1: Triple Point Pressure Greater Than 10 mm Hg | | | |
| 1. | Aluminum Chloride | 192.4 | 1800 |
| 2. | Terephthalic Acid | 427 | >760 |
| 3. | Acetylene | −81.5 | >760 |
| 4. | Para-formaldehyde | 155 | >760 |
| 5. | Carbon Dioxide | −57.5 | >760 |
| 6. | Ferric Chloride | 304 | 480 |
| 7. | Hydrogen Cyanide | −13.2 | 135 |
| 8. | Hydrogen Chloride | −114.3 | 100 |
| 9. | 2,2-Dimethyl Propane | −16.6 | 400 |
| 10. | Hexachlorobenzene | 230 | 100 |
| 11. | 1,3-Butadiyne | −34.9 | ≈100 |
| 12. | Anthraquinone | 286 | ≈100 |
| 13. | Ammonia | −77 | 50 |
| 14. | t-Butyl Alcohol | 25.3 | 42 |
| 15. | Hydrogen | −259.1 | >40 |
| 16. | Methane | −182.5 | ≈40 |
| 17. | Carbon Tetrabromide | 90.1 | ≈40 |
| 18. | Anthracene | 217.5 | >40 |
| 19. | Carbazole | 244.8 | 40 |
| 20. | Cyclobutane | −50 | 39 |
| 21. | Benzene | 5.5 | 35.9 |
| 22. | 1,2,4,5 Tetrachlorobenzene | 139 | 31.1 |
| 23. | t-Butyl Chloride | −26.5 | 26.2 |
| 24. | 1,4 Dioxane | 10 | 18.2 |
| 25. | Tetrachloroethylene | −35 | 14.3 |

TABLE 1-continued
Classification of Substances According to Triple Point Pressure

| | Substance | Triple Point Temperature (°C.) | Triple Point Pressure (mm Hg) |
|---|---|---|---|
| 26. | Chlorine | −100.7 | 10 |
| 27. | Chlorine Dioxide | −59.0 | 10 |
| 28. | Dimethyl Terephthalate | 140.65 | 10 |
| 29. | Salicylic Acid | 159 | >10 |
| 30. | Pyrocatechol | 105 | ≈10 |
| 31. | Formic acid | 8.2 | >10 |
| 32. | Hydroquinone | 170.3 | ≈10 |
| 33. | 1,2,4,5-Tetramethylbenzene | 79.5 | ≈10 |
| 34. | 4-Tert-Butylphenol | 99 | ≈10 |
| 35. | Camphene | 50 | >10 |
| Class 2: Triple Point Pressure in the Range of 1 mm Hg | | | |
| 1. | Benzoic Acid | 121.7 | <10 |
| 2. | 2-Naphthol | 122.5 | <10 |
| 3. | Pyrogallol | 133 | <10 |
| 4. | Actic Acid | 16.7 | 9.5 |
| 5. | 1,4 Dichlorobenzene | 53.0 | 9.13 |
| 6. | Phthalic Anhydride | 130.8 | 8.3 |
| 7. | Naphthalene | 80.2 | 7.7 |
| 8. | Formaldehyde | −92 | 7.0 |
| 9. | Water | 0 | 4.58 |
| 10. | 1,2 Ethanediamine | 8.5 | 4.3 |
| 11. | p-xylene | 13.3 | 4.29 |
| 12. | Iodosilane | −57.0 | 3.76 |
| 13. | Maleic Anhydride | 58.0 | 3.6 |
| 14. | Chloroacetic Acid | 61.2 | 3.21 |
| 15. | Acetamide | 81.0 | 2.9 |
| 16. | Succinimide | 125 | 2.3 |
| 17. | Acrylic Acid | 14 | 2.2 |
| 18. | Dichloroethane | −35.3 | 2.2 |
| 19. | Diacetamide | 78.5 | 2.1 |
| 20. | Oxygen | −218.4 | 1.23 |
| 21. | Phenol | 40.6 | 1.2 |
| 22. | t-Amyl Alcohol | −11.9 | 1.1 |
| 23. | 1-Naphthol | 96 | 1.1 |
| 24. | 4-Bromotoluene | 28.5 | >1 |
| 25. | 4-Chlorotoluene | 7.3 | >1 |
| 26. | 4-Chloroaniline | 70.5 | >1 |
| 27. | Cyclohexanol | 23.9 | >1 |
| 28. | Piperidine | −9 | >1 |
| 29. | Acenaphthene | 95 | >1 |
| 30. | Tetrachloroethylene | −19.0 | >1 |
| 31. | Tiglic Acid | 64.5 | >1 |
| Class 3: Triple Point Pressure lower than 1 mm Hg | | | |
| 1. | p-Nitrotoluene | 51.9 | 0.96 |
| 2. | Biphenyl | 69.5 | 0.94 |
| 3. | Acetanilide | 113.5 | 0.9 |
| 4. | Ethylene | −169 | 0.88 |
| 5. | Silicon Tetrachloride | −68.8 | 0.60 |
| 6. | 2,4 Dichlorophenol | 45 | 0.59 |
| 7. | 1,3 Butadiene | −108.9 | 0.49 |
| 8. | Epichlohydrin | −25.6 | 0.48 |
| 9. | Menthol | 42.5 | 0.4 |
| 10. | Silane (SiH$_4$) | −185.0 | 0.37 |
| 11. | Titanium Tetrachloride | −30.0 | 0.28 |
| 12. | Hydrogen Peroxide | −0.9 | 0.28 |
| 13. | o-Xylene | −25.2 | 0.18 |
| 14. | Styrene | −30 | 0.16 |
| 15. | Acrylnitrile | −82 | 0.046 |
| 16. | 1-Butene | −130 | 0.035 |
| 17. | m-Xylene | −47.9 | 0.028 |
| 18. | Ethane | −183.2 | 0.0086 |
| 19. | Trichlorosilane | −126.6 | 0.003 |
| 20. | Ethyl benzene | −94.9 | 0.0001 |

What we claim as follows:

1. A crystallization separation process for separating a multicomponent mixture that is at least partly in a liquid state and includes at least two key volatile components, denoted respectively as A-component and B-component, into a B-enriched portion and a B-lean portion through formation of a B-enriched solid mass, wherein the two components form a binary system (a) whose characteristic vapor pressure ratio defined as the ratio of the vapor pressure of A-component to that of B-component both evaluated at the triple point temperature of B-component is in the range of 0.1 to 10 and is less than the ratio of the heat of sublimation to the heat of melting of B-component evaluated at the triple point temperature of B-component, and (b) whose constant pressure phase diagram that includes a three phase (B-enriched solid, liquid and vapor) state has a two phase (B-enriched solid and vapor) region covering a substantial concentration range above the temperature of the three phase state and a two phase (B-enriched solid and liquid) region below the temperature of the three phase state, that comprises a first step of forming a first vapor mixture and a first condensed mass that comprises a mother liquor and a solid phase mass enriched in B-component by concurrently vaporizing the two components from the mixture in a first zone under a first temperature and a first pressure that are respectively lower than the triple point temperature and the triple point pressure of the pure B-component.

2. The process of claim 1, wherein B-enriched solid is formed as the two components are vaporized and the heat released in the formation of the B-enriched solid is at least partly removed by the concurrent vaporizations of the two components from the mixture.

3. The process of claim 2, wherein the said first step is continued until the mother liquor phase is reduced to a small amount to thereby transfer a large fraction of the A-component in the original mixture to the first vapor mixture and thereby form a purified B-solid.

4. The process of claim 3, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

5. The process of claim 1 which further comprises a second step of transforming the first vapor mixture into a second condensed mass that is at least partly in a liquid state in a second zone by transferring heat therefrom while maintaining the vapor under a second pressure that is also lower than the triple point pressure of the B-component.

6. The process of claim 5, wherein A-component has a greater volatility than the B-component, whereby the second condensed mass constitutes substantially a liquid output that is relatively enriched with the A-component.

7. The process of claim 6, wherein the said first step is continued until the mother liquid phase is reduced to a small amount to thereby transfer a large fraction of the A-component in the original mixture to the first vapor mixture and thereby form a purified B-solid.

8. The process of claim 7, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

9. The process of claim 5, wherein the second condensed mass includes a solid phase that is relatively enriched with respect to B-component and at least a portion of the second condensed mass is melted by transferring heat to the mass while maintaining the mass under an elevated pressure that is higher than the second pressure of the second step by vaporizing a minor fraction of the second condensed mass and providing pressure isolation of the second zone.

10. The process of claim 9, wherein the said first step is continued until the mother liquor phase is reduced to a small amount to thereby transfer a large fraction of the A-component in the original mixture to the first vapor mixture and thereby form a purified B-solid.

11. The process of claim 10, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

12. The process of claim 5, wherein the B-component is chosen from the following substances:

Aluminum Chloride, Terephthalic Acid, Acetylene, Para-formaldehyde, Carbon Dioxide, Ferric Chloride, Hydrogen Cyanide, Hydrogen Chloride, 2,2-Dimethyl Propane, Hexachlorobenzene, 1,3-Butadiyne, Anthraquinone, Ammonia, t-Butyl Alcohol, Hydrogen, Methane, Carbon Tetrabromide, Anthracene, Carbazole, Cyclobutane, Benzene, 1,2,4,5 Tetrachlorobenzene, t-Butyl Chloride, 1,4 Dioxane, Tetrachloroethylene, Chlorine, Chlorine Dioxide, Dimethyl Terephthalate, Salicylic Acid, Pyrocatechol, Formic Acid, Hydroquinone, 1,2,4,5-Tetramethylbenzene, 4-tert-Butylphenol, Camphene, Benzoic Acid, 2-Naphthol, Pyrogallol, Actic Acid, 1,4 Dichlorobenzene, Phthalic Anhydride, Naphthalene, Formaldehyde, Water, 1,2 Ethanediamine, p-xylene, Iodosilane, Maleic Anhydride, Chloroacetic Acid, Acetamide, Succinimide, Acrylic Acid, Dichloroethane, Diacetamide, Oxygen, Phenol, t-Amyl Alcohol, 1-Naphthol, 4-Bromotoluene, 4-Chlorotoluene, 4-Chloroaniline, Cyclohexanol, Piperidine, Acenaphthene, Tetrachloroethylene, Tiglic Acid, p-Nitrotoluene, Biphenyl, Acetanilide, Ethylene, Silicon Tetrachloride, 2,4 Dichlorophenol, 1,3 Butadiene, Epichlohydrin, Menthol, Silane ($SiH_4$), Titanium Tetrachloride, Hydrogen Peroxide, o-Xylene, Styrene, Acrylnitrile, 1-Butene, m-Xylene, Ethane, Trichlorosilane, Ethyl benzene.

13. The process of claim 12, wherein the said first step is continued until the mother liquor phase is reduced to a small amount to thereby transfer a large fraction of the A-component in the original mixture to the first vapor mixture and thereby form a purified B-solid.

14. The process of claim 5, wherein the said first step is continued until the mother liquor phase is reduced to a small amount to thereby transfer a large fraction of the A-component in the original mixture to the first vapor mixture and thereby form a purified B-solid.

15. The process of claim 14, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

16. The process of claim 1, wherein the said first step is continued until the mother liquor phase is reduced to a small amount to thereby transfer a large fraction of the A-component in the original mixture to the first vapor mixture and thereby form a purified B-solid.

17. The process of claim 16, that further comprises a third step of melting the purified B-solid in the first zone by pressure isolating the zone and supplying heat thereto to thereby transform a minor amount of the B-solid into vapor and raise the zone pressure to a pressure that is higher than the triple point pressure of the B-component, the melt of the B-solid constituting a purified B-product.

* * * * *